United States Patent
Kim et al.

(10) Patent No.: US 8,373,684 B2
(45) Date of Patent: Feb. 12, 2013

(54) HIGH RESOLUTION 2D-3D SWITCHABLE AUTOSTEREOSCOPIC DISPLAY APPARATUS

(75) Inventors: Tae-hee Kim, Suwon-si (KR); Dae-sik Kim, Suwon-si (KR); Sung-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1263 days.

(21) Appl. No.: 11/634,915

(22) Filed: Dec. 7, 2006

(65) Prior Publication Data

US 2007/0200792 A1    Aug. 30, 2007

Related U.S. Application Data

(60) Provisional application No. 60/776,733, filed on Feb. 27, 2006.

(30) Foreign Application Priority Data

May 16, 2006    (KR) .................. 10-2006-0043949

(51) Int. Cl.
*G09G 5/00*    (2006.01)
(52) U.S. Cl. ........... 345/204; 345/102; 349/15; 359/462
(58) Field of Classification Search .................... 348/59, 348/42; 345/102, 204; 349/15; 359/462
See application file for complete search history.

(56) References Cited

U.S. PATENT DOCUMENTS

| | | | | |
|---|---|---|---|---|
| 5,121,233 A * | 6/1992 | Spencer et al. | ................ | 349/69 |
| 5,969,850 A * | 10/1999 | Harrold et al. | ................ | 359/320 |
| 6,204,967 B1 * | 3/2001 | Morishima et al. | ............ | 359/462 |
| 6,275,254 B1 * | 8/2001 | Beeteson et al. | ................ | 348/59 |
| 7,057,638 B1 * | 6/2006 | Yuuki et al. | ..................... | 348/51 |
| 7,408,600 B2 * | 8/2008 | Yata et al. | ......................... | 349/75 |
| 7,619,604 B2 * | 11/2009 | Karman et al. | ................ | 345/102 |
| 2003/0107805 A1 * | 6/2003 | Street | ............................ | 359/464 |
| 2004/0017348 A1 * | 1/2004 | Numao | .......................... | 345/92 |
| 2005/0057702 A1 * | 3/2005 | Cho et al. | ........................ | 349/15 |
| 2005/0168815 A1 * | 8/2005 | Maruyama et al. | ........... | 359/465 |
| 2006/0139751 A1 * | 6/2006 | Cha et al. | ...................... | 359/465 |
| 2006/0170834 A1 * | 8/2006 | Kim et al. | ....................... | 349/15 |
| 2006/0209407 A1 * | 9/2006 | Hamagishi | .................... | 359/465 |
| 2007/0216828 A1 * | 9/2007 | Jacobs | ............................ | 349/64 |

FOREIGN PATENT DOCUMENTS

| | | |
|---|---|---|
| JP | 09-021979 A | 1/1997 |
| JP | 2001-154640 A | 6/2001 |
| JP | 2004-325494 A | 11/2004 |
| KR | 10-2002-0059028 A | 7/2002 |

* cited by examiner

*Primary Examiner* — Viet Pham
(74) *Attorney, Agent, or Firm* — Sughrue Mion, PLLC

(57) ABSTRACT

Provided is a high resolution 2D-3D switchable autostereoscopic display apparatus including: a backlight unit emitting light; a spatial light modulator comprising a plurality of cells, the cells being arranged two-dimensionally and comprising left eye regions and right eye regions that are each independently switchable between a transparent state and an opaque state; a lenticular lens sheet separating and emitting light passed through the spatial light modulator to a left eye viewing zone and a right eye viewing zone; and an image display panel displaying an image, wherein the spatial light modulator is divided into a plurality of horizontal segments that are sequentially switched in synchronization with a vertical synchronization signal of the image display panel.

15 Claims, 9 Drawing Sheets

HIGH RESOLUTION 2D-3D SWITCHABLE AUTOSTEREOSCOPIC DISPLAY APPARATUS

CROSS-REFERENCE TO RELATED PATENT APPLICATION

This application claims the benefit of Korean Patent Application No. 10-2006-0043949, filed on May 16, 2006, in Korean Intellectual Property Office and U.S. Provisional Patent Application No. 60/776,733, filed on Feb. 27, 2006, in the U.S. Patent and Trademark Office, the disclosures of which are incorporated herein in its entirety by reference.

BACKGROUND OF THE INVENTION

1. Field of the Invention

The present invention relates to a high-resolution 2D-3D switchable autostereoscopic display apparatus, and more particularly, to a high-resolution 2D-3D switchable autostereoscopic display apparatus in which a degradation of the resolution is counteracted and crosstalk is reduced.

2. Description of the Related Art

A 3D display apparatus produces a left eye image and a right eye image having a binocular parallax and separately directs the left and right eye images to a left eye and a right eye, respectively. The user recognizes the left eye image and the right eye image provided by the 3D display apparatus through the retina of the corresponding eyes and thus can see a stereoscopic 3D image. Generally, 3D display apparatuses can be roughly classified into a parallax barrier type 3D display apparatus and a lenticular type 3D display apparatus.

In the parallax barrier 3D display apparatuses, a left eye image and a right eye image are displayed on alternating vertical columns of pixels and separated through a very thin vertical lattice, that is, a barrier. The left eye image in a vertical column and the right eye image in a vertical column are separated by the barrier, so that the left and right eyes respectively receive images of different view points to thereby see a 3D image. Referring to FIG. 1, a lenticular type 3D display apparatus 10 generally includes an image display panel 11 including left and right pixels L and R that are alternately arranged to display a right eye image and a left eye image, respectively, and a lenticular lens sheet 12 installed in front of the image display panel 11 to separate the viewing zones of the left eye image and the right eye image.

In a conventional 3D image display apparatus as described above, the left eye image and the right eye image are displayed at the same time on a single image display panel, and thus the resolution of the 3D image the user sees is half of the resolution of the image display panel. Moreover, a complicated structure is required to be able to switch between a 2D image mode and a 3D image mode.

Accordingly, a 3D image display apparatus which can provide a 3D image without a reduction in resolution using a fast response liquid crystal display (LCD) having a refresh rate of 120 Hz is being developed.

FIG. 2 is a schematic view of a conventional 2D-3D switchable autostereoscopic display apparatus 20, which is disclosed in U.S. Pat. No. 5,969,850. Referring to FIG. 2, the 3D image display apparatus 20 includes a backlight unit 21, a spatial light modulator 22, a lenticular lens sheet 23, and a fast response LCD panel 26. The spatial light modulator 22 includes a plurality of cells 24 and 25, which are switched between a transparent state and an opaque state according to the ON/OFF state of the power supplied thereto. The LCD panel 26 alternately displays the left eye image and the right eye image on the entire screen at a fast refresh rate. The spatial light modulator 22 is synchronized with the switching time of the left and right eye images of the LCD panel 26 to switch the cells 24 and 25 into the transparent or opaque state. For example, while the LCD panel 26 is displaying a left eye image, the spatial light modulator 22 switches the left eye cell 24 to a transparent state, and thus the light emitted from the backlight unit 21 heads only to the left eye viewing zone 28 of the user. While the LCD panel 26 is displaying a right eye image, the spatial light modulator 22 switches on the right eye cell 25 so that the light emitted from the backlight unit 21 heads only to the right eye viewing zone 27 of the user. In a general 2D mode, all of the cells 24 and 25 of the spatial light modulator 22 are turned on.

However, in U.S. Pat. No. 5,969,850, crosstalk occurs between a left eye image and a right eye image for the following reasons, and thus the user cannot watch an accurate 3D image.

In general, most image display panels scan a frame from top to bottom. Thus, while a previous frame is being displayed at the bottom of the screen, the next frame is displayed at the top of the screen. As illustrated in FIG. 3, when T indicates the time required to completely scan one frame, a right eye image is displayed on the entire screen at time 0, and a left eye image is displayed on the entire screen at time T. However, since the right eye image is continually changing to the left eye image between time 0 and time T, the left eye image is displayed at the top of the screen and at the same time the right eye image is displayed at the bottom of the screen. As a result, there exists a period when the left eye image and the right eye image share the screen. Therefore, as in U.S. Pat. No. 5,969,850, when the left eye cells 24 and the right eye cells 25 of the spatial light modulator 22 are simply alternately turned on and off, the left eye image and the right eye image may not be completely separated and sensed by the left eye and the right eye of the user at the same time, so that serious crosstalk may be generated.

SUMMARY OF THE INVENTION

The present invention provides a high resolution 2D-3D switchable autostereoscopic display apparatus in which a degradation of the resolution is counteracted and crosstalk is reduced.

The present invention also provides a high resolution 2D-3D switchable autostereoscopic display apparatus which is structurally simple and does not require expensive components.

According to an aspect of the present invention, there is provided a high resolution 2D-3D switchable autostereoscopic display apparatus including: a backlight unit emitting light; a spatial light modulator comprising a plurality of cells, the cells being arranged two-dimensionally and comprising left eye regions and right eye regions that are each independently switchable between a transparent state and an opaque state; a lenticular lens sheet separating and emitting light passed through the spatial light modulator to a left eye viewing zone and a right eye viewing zone; and an image display panel displaying an image, wherein the spatial light modulator is divided into a plurality of horizontal segments that are sequentially switched in synchronization with a vertical synchronization signal of the image display panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
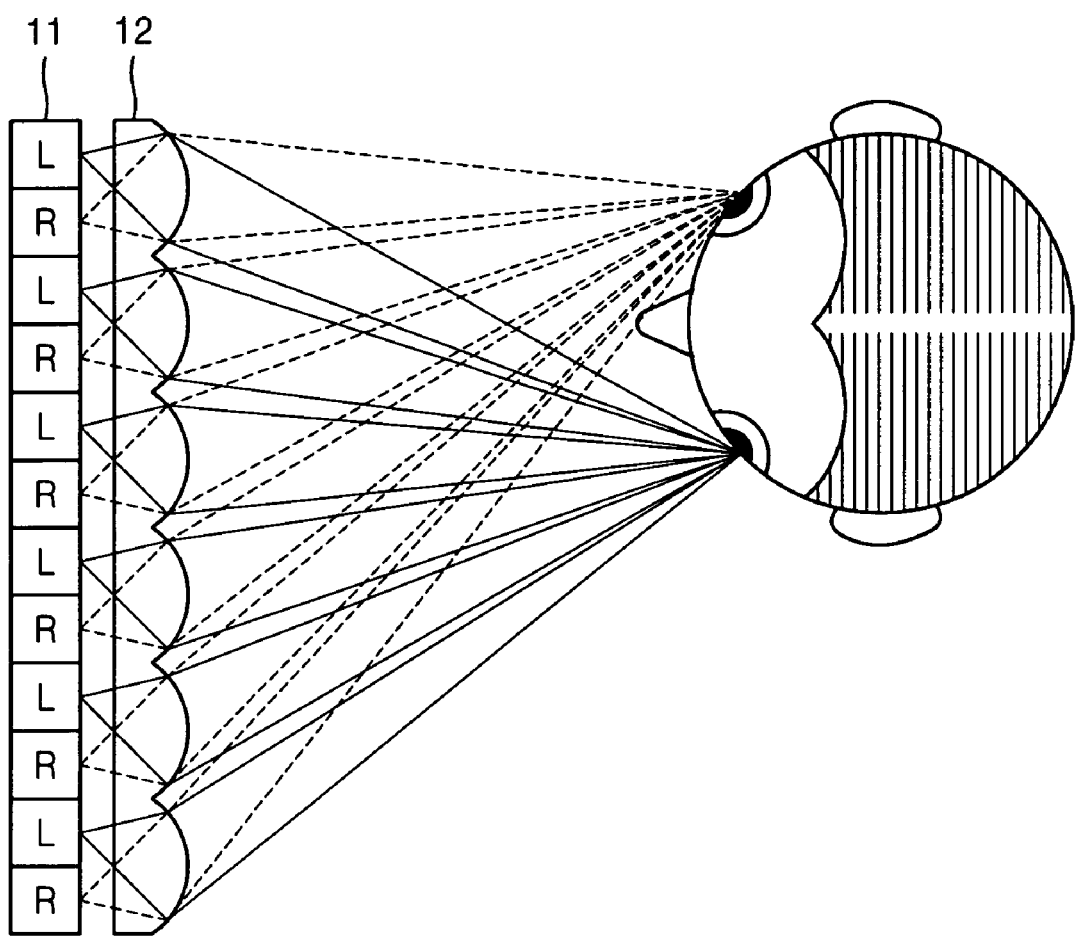
FIG. 1 is a schematic view of a conventional lenticular type 3D image display apparatus.
Figure 2:
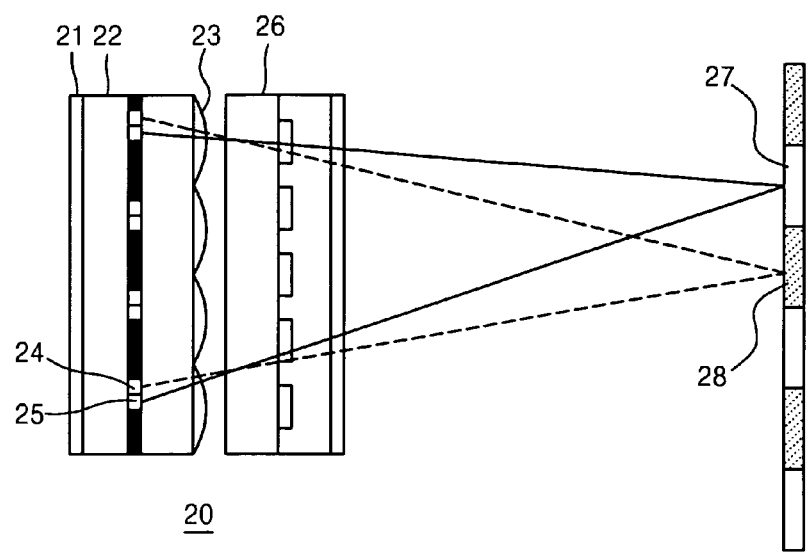
FIG. 2 is a schematic view of a conventional 2D-3D switchable autostereoscopic display apparatus.
Figure 3:
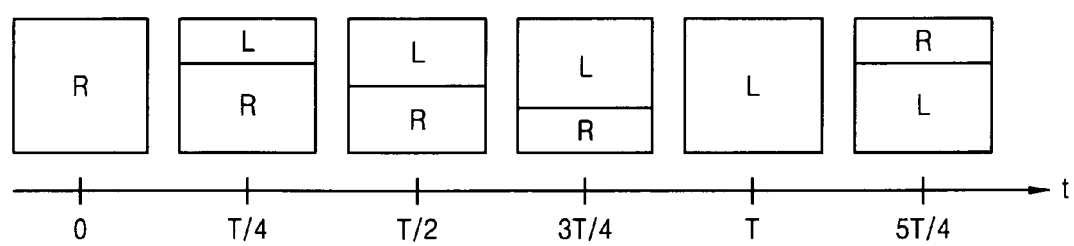
FIG. 3 illustrates a process of scanning a left eye image and a right eye image on an image display panel.
Figure 4:
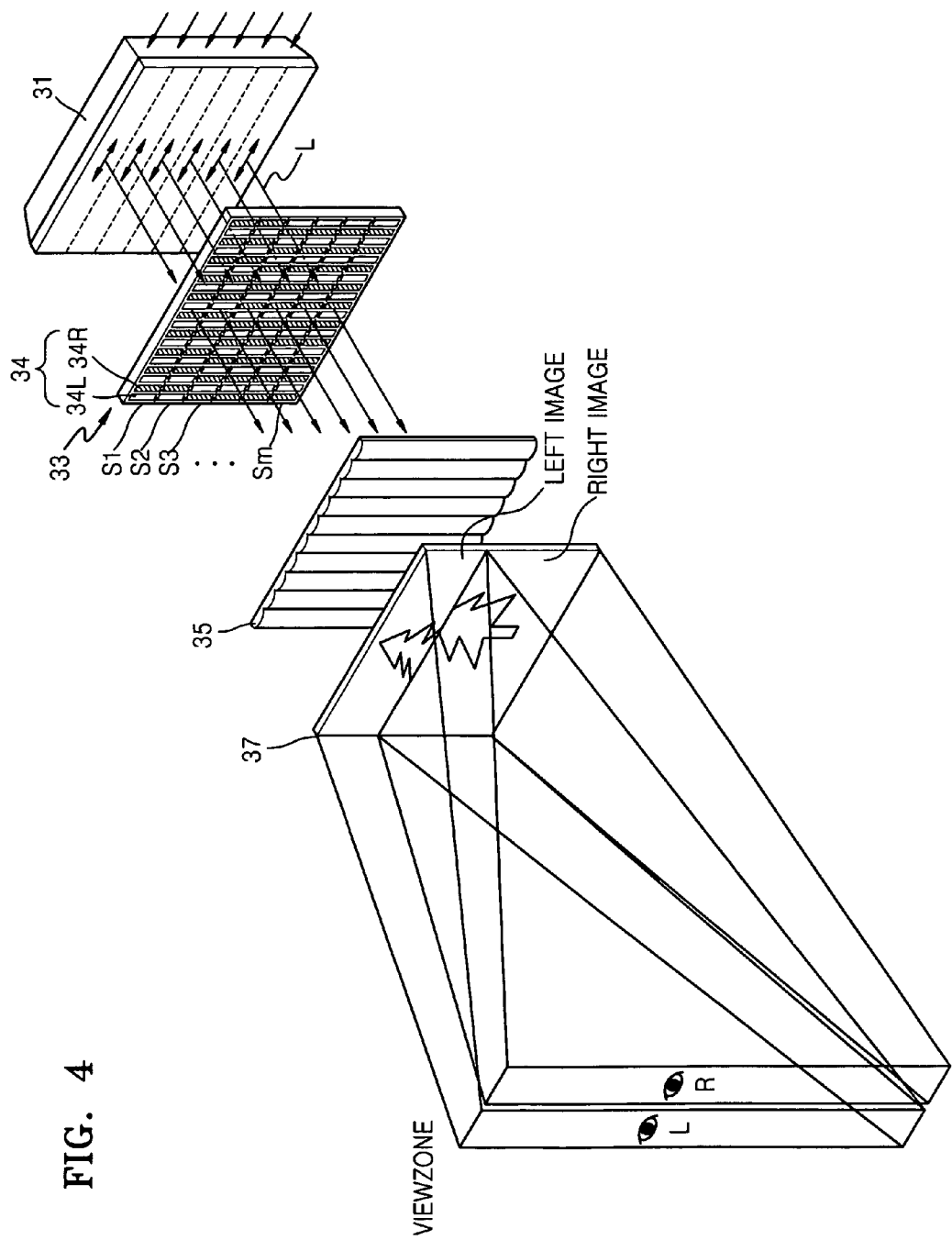
FIG. 4 is a schematic view of a 2D-3D switchable image display apparatus according to an embodiment of the present invention.
Figure 5:
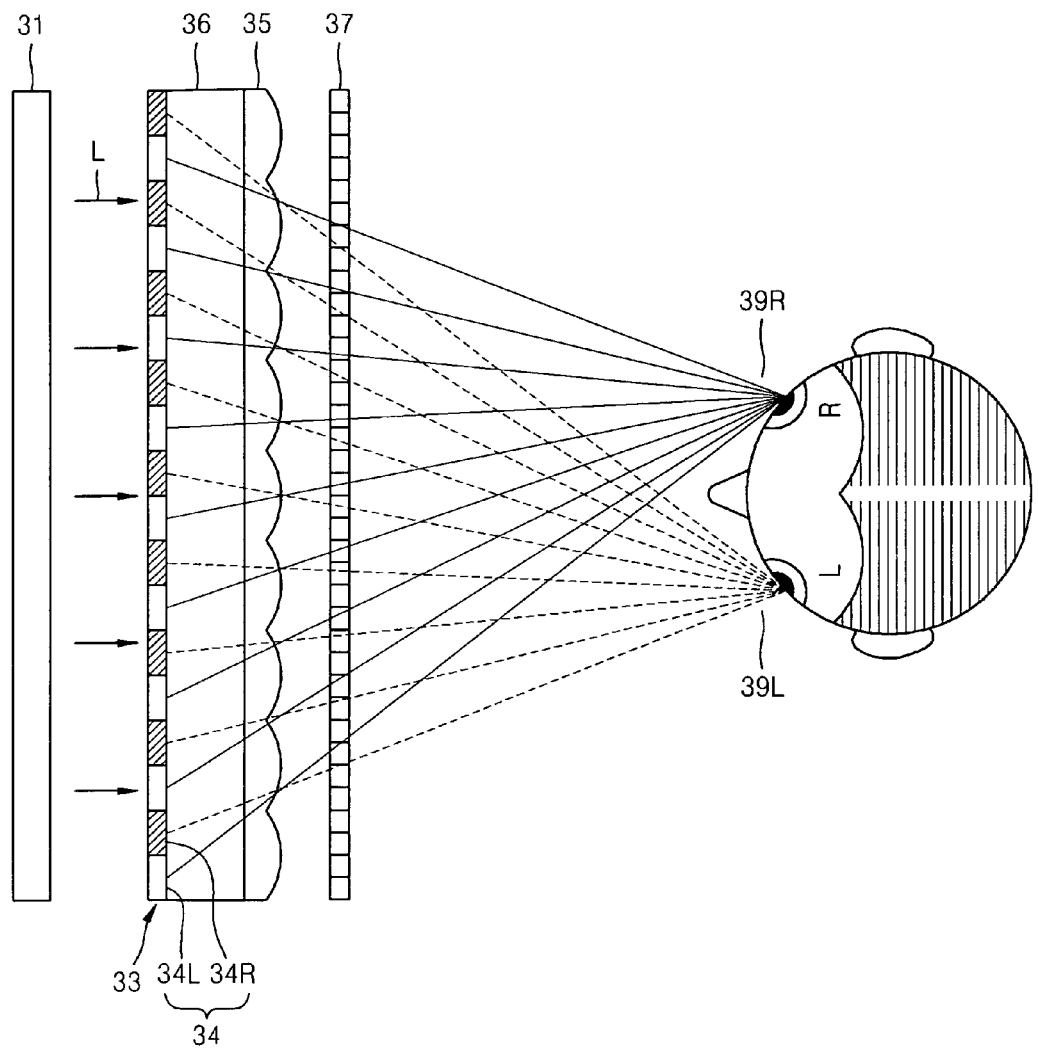
FIG. 5 is a schematic top view of the autostereoscopic display apparatus of FIG. 4.
Figure 6:
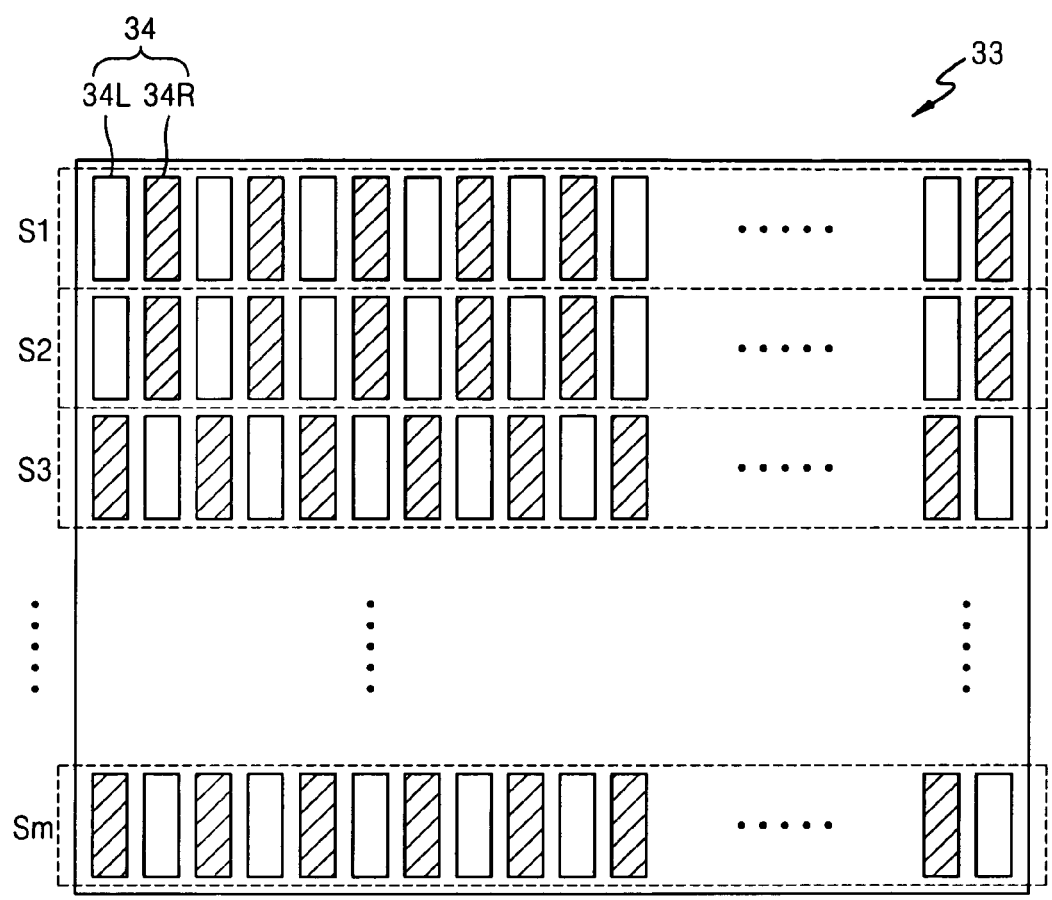
FIG. 6 illustrates a parallax barrier pattern of a spatial light modulator of the autostereoscopic display apparatus of FIG. 4.

FIG. 4 is a schematic view of a high resolution 2D-3D switchable autostereoscopic display apparatus according to an embodiment of the present invention. FIG. 5 is a schematic top view of the autostereoscopic display apparatus of FIG. 4. FIG. 6 illustrates a parallax barrier pattern of a spatial light modulator 33 of the autostereoscopic display apparatus of FIG. 4.

Referring to FIGS. 4 through 6, the high resolution 2D-3D switchable autostereoscopic display apparatus includes a backlight unit 31, a spatial light modulator 33 transmitting only light with a predetermined polarization component among the light emitted from the backlight unit 31, a lenticular lens sheet 35 separating the light transmitted by the spatial light modulator 33 into a left eye viewing zone and a right eye viewing zone, and an image display panel 37 displaying an image.

The image display panel 37 is a passive device that requires a special light source. For example, a liquid crystal panel that displays an image by applying a voltage to each pixel to adjust the light transmittance of the pixels may be uses as the image display panel 37. According to the present embodiment, as in a conventional high resolution 3D image display apparatus, the image display panel 37 alternately displays a right eye image and a left eye image in a 3D mode according to time. Accordingly, a fast response LCD panel having a refresh rate greater than 120 Hz may preferably be used as the image display panel 37 so that the user can see the right eye image and the left eye image without flickering.

As illustrated in FIG. 6, the spatial light modulator 33 includes a plurality of cells 34 arranged in a two-dimensional (2D) m×n matrix. Each of the cells 34 includes a left eye region 34LL and a right eye region 34RR that switch between a transparent state and an opaque state according to the ON/OFF state of a power supply. For example, a transmissive liquid crystal device including electrodes having a parallax barrier pattern that correspond to the cells 34, and liquid crystal controlled according to a voltage applied to the electrodes may be used as the spatial light modulator 33. The transmissive liquid crystal device has a simple structure and thus can be easily manufactured at low costs.

The spatial light modulator 33 is divided into m horizontal segments S1, S2, . . . , and Sm that correspond to a plurality of horizontal pixel lines of the image display panel 37. The horizontal segments S1, S2, . . . , and Sm correspond to horizontal lines of cells 34 of the spatial light modulator 33. The horizontal segments S1, S2, . . . , and Sm sequentially switch in synchronization with a vertical synchronization signal of the image display panel 37 and keep on or off states while the pixel lines of the image display panel 37 are displaying an image.

Since the horizontal segments S1, S2, . . . , and Sm of the spatial light modulator 33 are sequentially driven, the backlight unit 31 is preferably divided into a plurality of horizontal segments that can be driven independently, so that the backlight unit 31 is driven in synchronization with the spatial light modulator 33. The number of horizontal segments of each of the backlight unit 31 and the spatial light modulator 33 may vary according to the design. In order to remove crosstalk completely, each of the segments of each of the backlight unit 31 and the spatial light modulator 33 needs to correspond to a pixel line of the image display panel 37. However, this may be too costly to realize. Thus, each of the horizontal segments of each of the backlight unit 31 and the spatial light modulator 33 may preferably correspond to a plurality of pixel lines of the image display panel 37. For example, each of the horizontal segments of each of the backlight unit 31 and the spatial light modulator 33 may correspond to one hundred pixel lines of the image display panel 37. The number of horizontal segments of the backlight unit 31 is preferably equal to that of horizontal segments of the spatial light modulator 33.

As described above, since the horizontal segments S1, S2, . . . , and Sm of the spatial light modulator 33 are sequentially driven and the horizontal segments of the backlight unit 31 are sequentially driven, it is easy to display a color image using a field sequential driving technique. When the high resolution 2D-3D switchable autostereoscopic display apparatus uses the field sequential driving technique to display an image, the backlight unit 31 includes R, G, and B monochromatic light sources which are sequentially driven in synchronization with the horizontal segments of the spatial light modulator 33 and the image display panel 37. However, the present invention is not limited to the autostereoscopic display apparatus employing the field sequential driving technique but a color filtering technique may be used to display a color image. When the color filtering technique is used, the backlight unit 31 includes a white light source.

The lenticular lens sheet 35 includes a plurality of vertical lenticular lenses arranged in the horizontal direction. Accordingly, the lenticular lenses are parallel to vertical lines of cells 34 of the spatial light modulator 33. The lenticular lens sheet 35 separates and emits incident light to a left eye viewing zone and a right eye viewing zone, and thus the light transmitted through the lenticular lens sheet 35 is imaged separately in the left eye viewing zone and the right eye viewing zone at a viewing distance according to the location on the lenticular lens sheet 35 upon which light is incident. For example, the lights emitted from the left eye regions 34L of the cells 34 can be guided to the left eye viewing zone via the lenticular lens sheet 35. The lights emitted from the right eye regions 34R of the cells 34 can be guided to the right eye viewing zone via the lenticular lens sheet 35.

As is well known in the art, the distance between the left eye viewing zone and the right eye viewing zone at the viewing distance may be approximately 65 mm. To this end, the pitch between the lenticular lenses of the lenticular lens sheet 35 may be equal to or, preferably, slightly less than the pitch between the first and second birefringent elements 34a and 34b of the birefringent element array 34. Also, the distance between the lenticular lens sheet 35 and the birefringent element array 34 may be equal to or, preferably, slightly greater than the focal distance of each of the lenticular lenses. As illustrated in FIG. 4, a transparent substrate 36 may be placed between the lenticular lens sheet 35 and the birefringent element array 34. For example, the birefringent element array 34 and the lenticular lens sheet 35 may be attached to both surfaces of the transparent substrate 36 to fix the locations of the lenticular lens sheet 35 and the birefringent element array 34.

The operation of the high resolution 2D/3D switchable autosteroscopic display apparatus of FIG. 4 will now be described more fully. First, in a 3D mode, the image display panel 37 alternately displays a right eye image and a left eye image on the entire screen at a very fast rate. The spatial light modulator 33 switches the cells 34 in synchronization with the switching of the right and left images by the image display panel 37. For example, while the image display panel 37 is displaying a left eye image, the left eye regions 34L of the cells 34 of the spatial light modulator 33 are switched to a transparent state, so that the light L emitted from the backlight unit 31 passes through only the left eye regions 34L. While the image display panel 37 is displaying a right eye image, the right eye regions 34R of the cells 34 of the spatial light modulator 33 are switched on, so that the light L emitted from the backlight unit 31 passes through only the right eye regions 34R. The light passed through the left and right eye regions 34L and 35R are separated by the lenticular lens sheet 35, passed through the image display panel 37, and form the left eye image and the right eye image in a left eye viewzone 39L and a right eye viewzone 39R, respectively. Accordingly, when the image display panel 37 displays the left eye image, the user senses only the left eye image through the user's left eye. When the image display panel 37 displays the right eye image, the user senses only the right eye image through the user's right eye. Thus, the user can view a 3D image.

The image display panel 37 does not display a right eye image at one time and then a left eye image at another time but sequentially scans consecutive images from top to bottom on the screen. Accordingly, there is a period when the left eye image and the right eye image share the screen, and thus a crosstalk which is a mixture of the left eye image and the right eye image may occur.

Considering this problem, each of the backlight unit 31 and the spatial light modulator 33 is switched sequentially in the vertical direction in synchronization with the vertical scanning time of the image display panel 37. The corresponding horizontal segments of the backlight unit 31 and the spatial light modulator 33 are switched at the same time. As illustrated in FIGS. 4 and 6, when the upper screen of the image display panel 37 displays a left eye image and the lower screen thereof displays a right eye image, only the left eye regions 34L of the cells 34 in the horizontal segments S1 and S2 in the upper part of the spatial light modulator 33 are switched into a transparent state, and only the right eye regions 34R of the cells 34 in the horizontal segments S3, ..., and Sm in the lower part of the spatial light modulator 33 are switched into a transparent state.

More specifically, when considering the fact that a horizontal segment corresponds to a plurality of pixel lines, in order to minimize crosstalk, the backlight unit 31 and the spatial light modulator 33 may be driven in the following manner.

Figure 7:
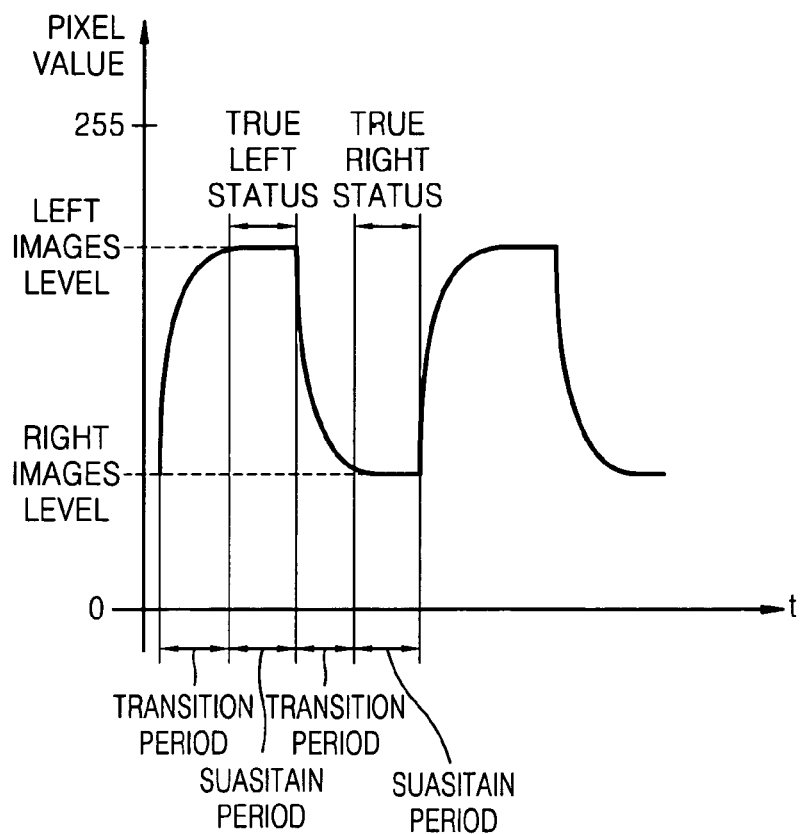
FIG. 7 is a graph showing a change in pixel values of a pixel line according to time.

FIG. 7 is a graph showing a change in pixel values of a pixel line of an LCD panel used as the image display panel 37 according to time. As illustrated in FIG. 7, each pixel line is switched sequentially between the pixel values corresponding to the left eye image and the right eye image. As the graph of FIG. 7 shows, the left eye image and the right eye image in each pixel line do not change instantly, but require a predetermined time. In other words, after a predetermined period of time after the start of display, a complete left eye image or right eye image is displayed in each pixel line. Accordingly, left and right eye images are mixed during a transition period when the left eye image is converted to the right eye image or the right eye image is converted to the left eye image, and thus it is desirable that the horizontal segment of the backlight unit 31 corresponding to the pixel line corresponding to the transition period is turned off if possible.

Figure 8:
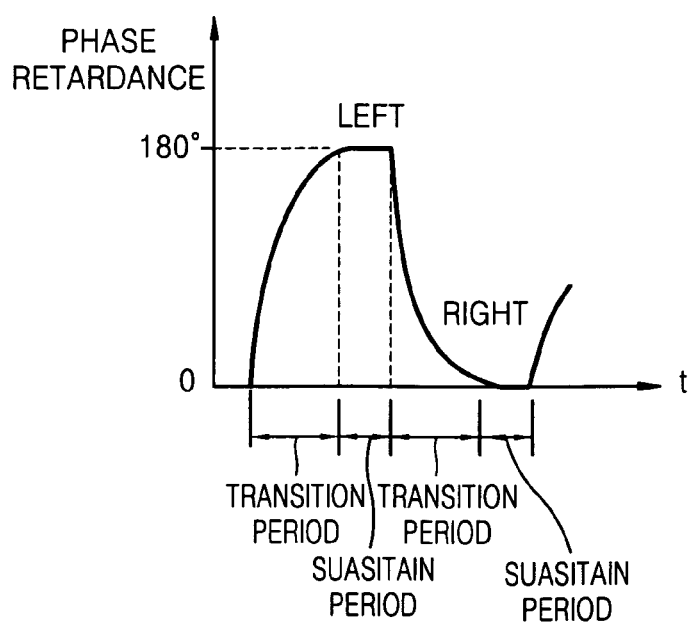
FIG. 8 is a graph showing the switching operation of the spatial light modulator of the 2D-3D switchable image display apparatus of FIG. 4, according to time.

FIG. 8 is a graph showing the switching operation of a transmissive liquid crystal device used as the spatial light modulator 33 according to time. As illustrated in the graph of FIG. 8, the conversion of the spatial light modulator 33 from the opaque state to the transparent or the inverse conversion does not occur immediately according to the characteristics of the liquid crystal element but requires a predetermined time. In other words, the spatial light modulator 33 completely switches from the opaque state to the transparent state after the lapse of a state transition period after switching has started. If the spatial light modulator 33 and the image display panel 37 operate at the same response speed, the transition speed of the state of the spatial light modulator 33 and the image transition speed of the image display panel 37 may be almost the same. Accordingly, it is preferable that the state of a horizontal segment of the spatial light modulator 33 starts to convert at the point in time when the image displayed on the corresponding pixel line of the image display panel 37 starts to be converted into a left eye image or a right eye image.

Figure 9:
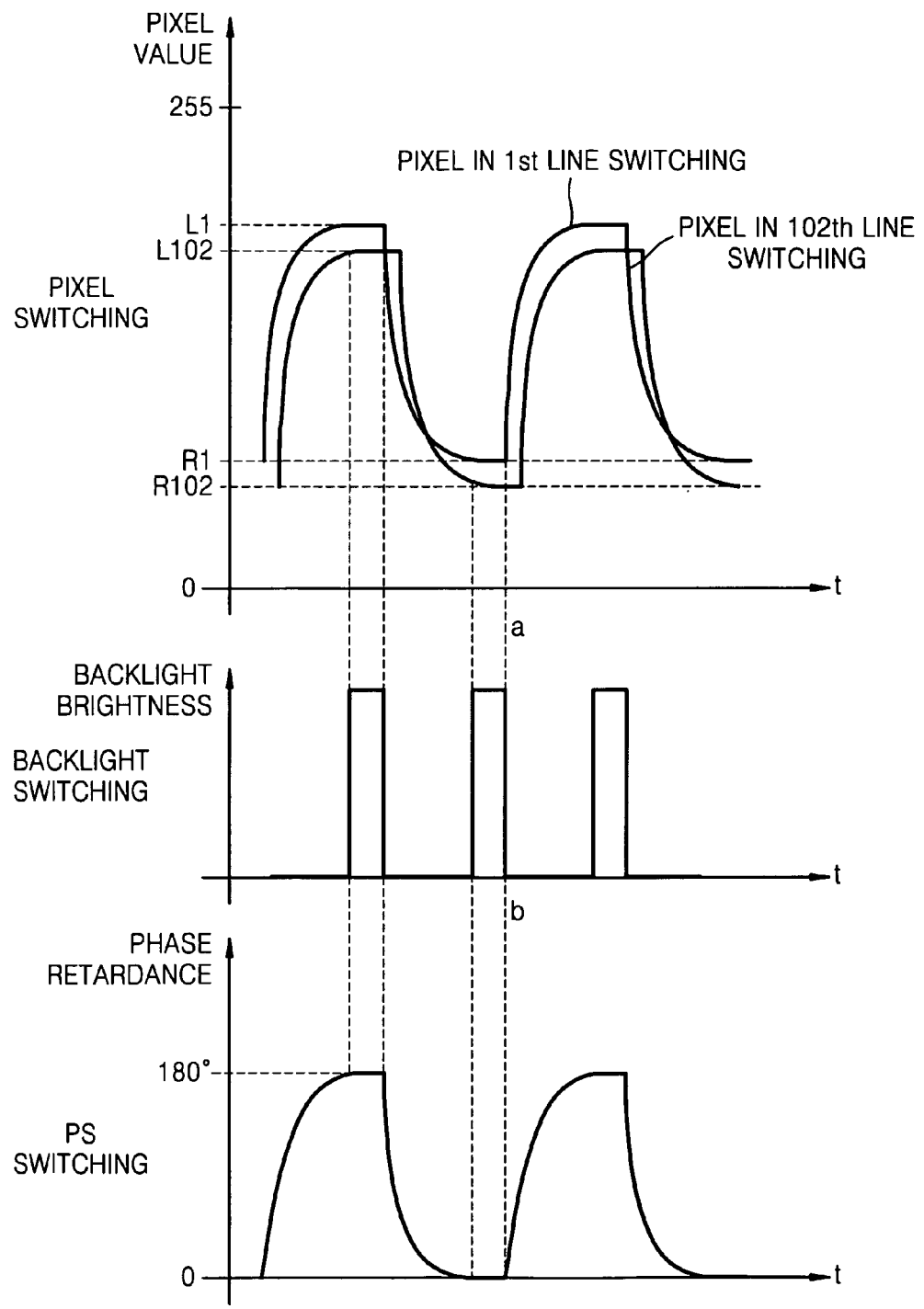
FIG. 9 is a graph showing the operation of a horizontal segment of each of a backlight unit and the spatial light modulator which are included in the 2D-3D switchable image display apparatus of FIG. 4 and each have a plurality of horizontal segments.
Figure 10:
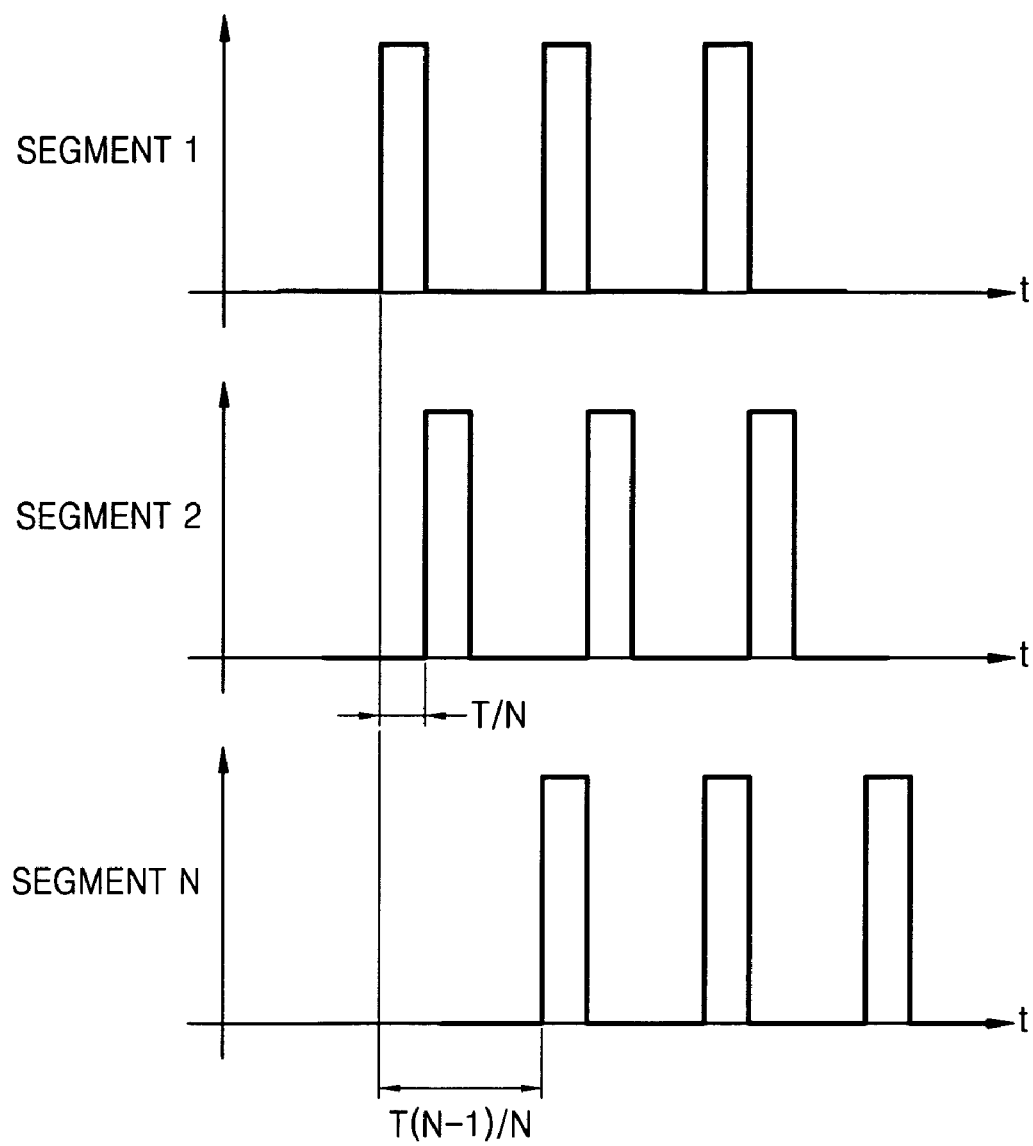
FIGS. 10 and 11 illustrate the operations of the horizontal segments of the backlight unit and those of the horizontal segments of the spatial light modulator, respectively.

Accordingly, a horizontal segment of the spatial light modulator 33 and a corresponding segment of the backlight unit 31 can operate as illustrated in the graphs of FIG. 9. The graph at the top of FIG. 9 shows the change in pixel values of the pixel lines of the image display panel 37 that correspond to the segments of the spatial light modulator 33 and the backlight unit 31. For example, it is assumed that one horizontal segment corresponds to 102 pixel lines. As the image display panel 37 scans an image from top to bottom in a sequence, as illustrated in FIG. 10, there is a slight delay among the pixel value variation lines of the first through $102^{nd}$ pixel lines. In this case, as illustrated in FIG. 9, in order to minimize crosstalk, the horizontal segment of the backlight unit 31 is turned on when the $102^{nd}$ pixel line starts to completely display a left eye image and then turned off when the first pixel line finishes to completely display the left eye image. That is, each of the horizontal segments of the backlight unit 31 can perform a pulse operation, that is, can be turned on only while all of the corresponding pixel lines are displaying right eye images or left eye images and turned off while the left and right eye images are being switched.

On the other hand, as illustrated in FIG. 9, each of the horizontal segments of the spatial light modulator 33 is switched when the first pixel line of the corresponding pixel lines of the image display panel 37 is converted to a right eye image or a left eye image. For example, the left eye regions 34L of the cells 34 of each horizontal segment of the spatial light modulator 33 are switched to the transparent state and the right eye regions 34R thereof are switched to the opaque state, when the first pixel line of the corresponding pixel lines of the image display panel 37 starts to display a left eye image. The left eye regions 34L of the cells 34 of each horizontal segment of the spatial light modulator 33 are switched to the opaque state and the right eye regions 34R thereof are switched to the transparent state, when the first pixel line of the corresponding pixel lines of the image display panel 37 starts to display a right eye image.

Figure 11:
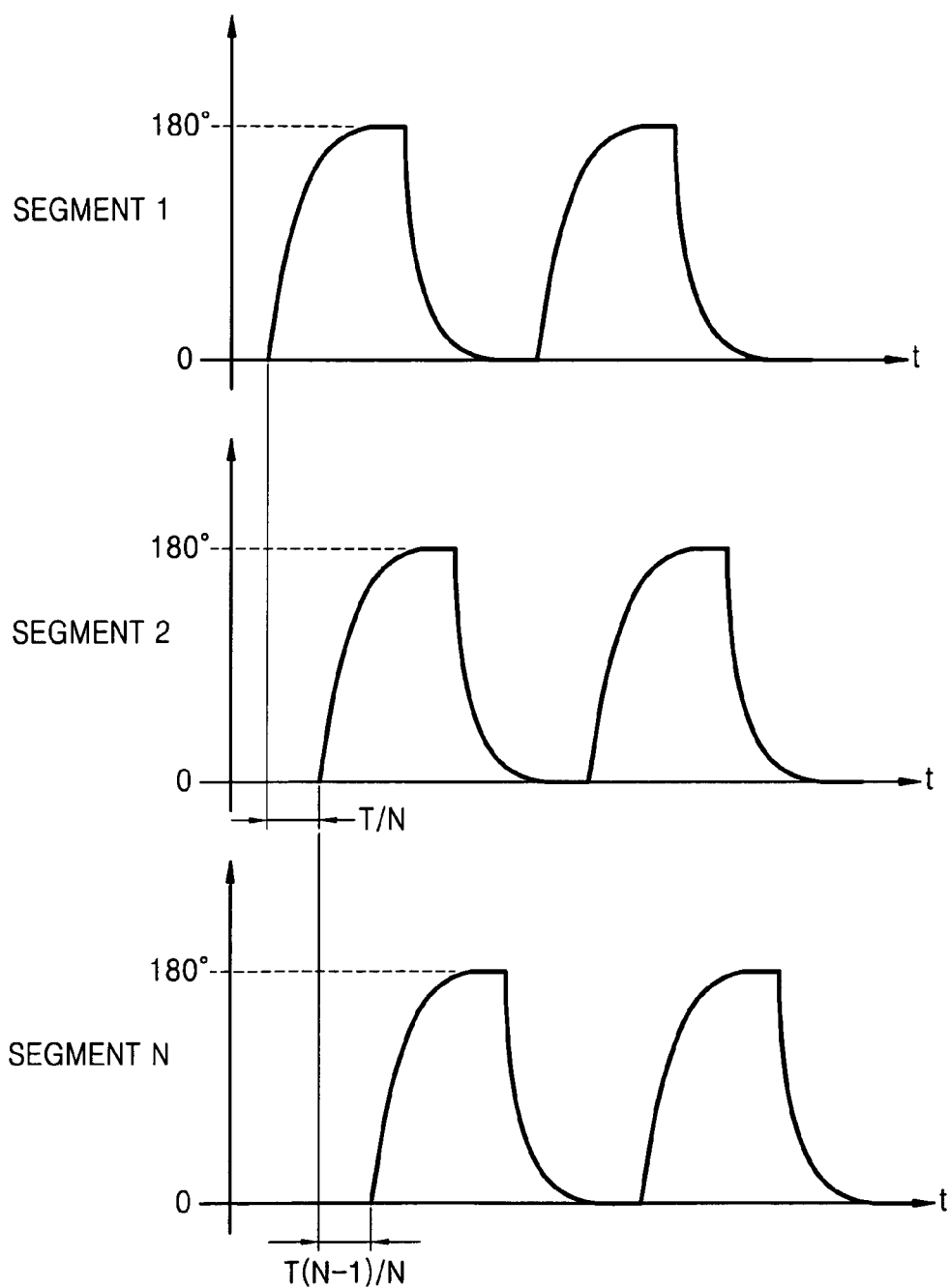

FIG. 10 illustrates the sequential operations of a plurality of horizontal segments of the backlight units 31, and FIG. 11 illustrates the sequential operations of a plurality of horizontal segments of the spatial light modulator 33. As described above, the horizontal segments of the backlight unit 31 and the spatial light modulator 33 are arranged along the vertical direction, and the image display panel 37 scans an image from top to bottom. Thus, as illustrated in FIGS. 10 and 11, the horizontal segments of the backlight unit 31 and the spatial light modulator 33 are sequentially operated from top to bottom in synchronization with the vertical scanning time of the image display panel 37.

As described above, the backlight unit 31 and the spatial light modulator 33 are each sequentially switched from top to bottom in synchronization with the vertical synchronization signal of the image display panel 37, so that crosstalk due to the display of images on the upper and lower parts of the screen of the image display panel 37 as a left eye image and a right eye image can be reduced.

A 2D mode can be realized in two ways. For example, the spatial light modulator 33 may be repetitively switched between the transparent state and the opaque state, and the image display panel 37 displays a 2D image twice consecutively. Then, the same 2D image is sensed consecutively by the right eye and the left eye of the user, so that the user can watch a 2D image.

Alternatively, the left and right eye regions 34L and 34R of the cells 34 of the spatial light modulator 33 are all fixed in a transparent state, and the image display panel 37 displays a 2D image at an ordinary rate. As a result, both the lights which have been transmitted by the left and right eye regions 34L and 34R pass through the image display panel 37 and are imaged on the left eye viewing zone and the right eye viewing zone. Thus, when the image display panel 37 displays a 2D image, the user can see a 2D image through the left eye and the right eye.

Up to now, a high resolution 2D-3D switchable autostereoscopic display apparatus according to the present invention can be structured simply by using a spatial light modulator, such as, a transmissive liquid crystal device. Moreover, the horizontal segments of the spatial light modulator switch in synchronization with the vertical scanning time of an image display panel, and thus, crosstalk rarely occurs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high resolution 2D-3D switchable autostereoscopic display apparatus comprising:
    a backlight unit emitting light;
    a spatial light modulator comprising a plurality of cells, the cells being arranged two-dimensionally and comprising left eye regions and right eye regions that are each independently switchable between a transparent state and an opaque state;
    a lenticular lens sheet separating and emitting light passed through the spatial light modulator to a left eye viewing zone and a right eye viewing zone; and
    an image display panel displaying an image,
    wherein the spatial light modulator is divided into a plurality of horizontal segments that are sequentially switched from top to bottom during vertical scanning, by the image display panel, of a frame of the image, in synchronization with a vertical synchronization signal of the image display panel, and
    wherein the spatial light modulator is a transmissive liquid crystal device that includes electrodes having a parallax barrier pattern that correspond to the cells, and liquid crystal controlled according to a voltage applied to the electrodes.

2. The apparatus of claim 1, wherein each of the horizontal segments of the spatial light modulator is a horizontal array of cells of the spatial light modulator.

3. The apparatus of claim 2, wherein each of the horizontal segments of the spatial light modulator corresponds to a plurality of horizontal pixel lines of the image display panel.

4. The apparatus of claim 3, wherein the backlight unit is divided into a plurality of horizontal segments that are independently driven.

5. The apparatus of claim 4, wherein the number of horizontal segments of the backlight unit is equal to the number of horizontal segments of the spatial light modulator.

6. The apparatus of claim 5, wherein each of the horizontal segments of the backlight unit is switched simultaneously with the corresponding horizontal segment of the spatial light modulator.

7. The apparatus of claim 1, wherein the lenticular lens sheet comprises a plurality of vertical lenticular lenses which are parallel to vertical lines of cells of the spatial light modulator and arranged in a horizontal direction.

8. The apparatus of claim 7, wherein a pitch between the vertical lenticular lenses is equal to or less than a pitch between the vertical cell lines.

9. The apparatus of claim 7, wherein the distance between the lenticular lens sheet and the spatial light modulator is equal to or greater than the focal distance of each of the vertical lenticular lenses.

10. The apparatus of claim 1, wherein the image display panel alternately and sequentially displays a right eye image and a left eye image in a 3D mode.

11. The apparatus of claim 10, wherein:
    when pixel lines of the image display panel that correspond to each horizontal segment of the spatial light modulator display a right eye image, the right eye regions of the cells of each horizontal segment are switched to a transparent state and the left eye regions of the cells of each horizontal segment are switched to an opaque state; and
    when pixel lines of the image display panel that correspond to each horizontal segment of the spatial light modulator display a left eye image, the right eye regions of the cells of each horizontal segment are switched to an opaque state and the left eye regions of the cells of each horizontal segment are switched to a transparent state.

12. The apparatus of claim 11, wherein the backlight unit is divided into a plurality of horizontal segments which are driven independently, and each of the horizontal segments is switched on while the corresponding pixel lines of the image display panel are all displaying a right eye image or a left eye image and switched off while the corresponding pixel lines are converting between the left and right eye images.

13. The apparatus of claim 1, wherein when the image display panel is in a 2D mode, both the left and right eye regions of each of the cells of the spatial light modulator are switched to a transparent state.

14. The apparatus of claim 1, wherein the image display panel is a liquid crystal panel.

15. The apparatus of claim 1, wherein:
 a first horizontal segment of the spatial light modulator corresponds to a first portion of the image display panel and a second horizontal segment of the spatial light modulator corresponds to a second portion of the image display panel; and
 when the first portion of the image display panel displays a portion of a left eye image simultaneously while the second portion of the image display panel displays a portion of a right eye image, left eye regions of a first horizontal segment of the spatial light modulator are operated in the transparent state, right eye regions of the first horizontal segment of the spatial light modulator are operated in the opaque state, left eye regions of a second horizontal segment of the spatial light modulator are operated in the opaque state, and right eye regions of the second horizontal segment of the spatial light modulator are operated in the transparent state.

* * * * *